Patented Sept. 14, 1943

2,329,406

UNITED STATES PATENT OFFICE 2,329,406

WATER SOLUBLE CONDENSATION PRODUCT AND PROCESS FOR MAKING THE SAME

Ernst Alfred Mauersberger, Maarssen, near Utrecht, Netherlands, assignor to Alframine Corporation, New York, N. Y., a corporation of New York No Drawing. Application April 26, 1940,
Serial No. 331,838

2 Claims. (Cl. 260—401)

My invention relates to a process for making new water soluble acid addition compounds by reacting certain esters with certain alkylolamides and to the products obtained by such reactions.

One object of my invention is to produce new textile and leather softening agents which are highly efficient and clearly and completely soluble in cold water and which do not produce any undesirable effects on the goods to which they are applied.

Another object of the invention is to produce new emulsifying agents for artificial resins.

Still another object of my invention is to produce condensation compounds which can be used as assistants in the pre-shrinking treatments of textiles to improve the results of such treatments.

According to the invention I accomplish these and other results which will become apparent as the description proceeds, generally, by reacting an aliphatic ester of a polyvalent inorganic acid, said ester containing, in each alcohol radical, from 1 to 5 carbon atoms, with a monoalkylolamide polyamine of the general formula:

$$R-CO-(NR_1-C_xH_{2x})_n-NR_1-C_yH_{2y}-OH$$

in which R represents any aliphatic chain having at least 7 carbon atoms and containing saturated, unsaturated or hydroxyl groups, one $R_1$ represents a hydrogen atom and each remaining $R_1$ represents a hydrogen atom which may be substituted, $x$ and $y$ each represent a number from 2 to 5 inclusive and $n$ represents a number from 1 to 3 inclusive. At least one mol ester is used for each mol of alkylolamide and the reaction is carried out at elevated temperatures between 70° C. and 170° C. until at least one hydrogen atom of an amino group has been replaced by an alkyl and the acid addition compound has been formed.

The esters which, according to the invention, can be reacted with the alkylolamides, are those of the lower aliphatic alcohols, as methylalcohol, ethylalcohol, propylalcohol, butylalcohol and amylalcohol with a polyvalent inorganic acid, such as sulphuric acid and phosphoric acid.

According to one embodiment of my invention the above described esters are condensed with akylolamides having the general formula:

$$R-CO-(NH-C_xH_{2x})_n-NH-C_yH_{2y}-OH$$

as obtained from the reaction of any fatty acid having at least 7 carbon atoms in the molecule with a suitable monoalkylolpolyamine.

The condensation starts at an elevated temperature when an alkyl group is split off from the ester and replaces the hydrogen in one of the amino groups. The substituted hydrogen forms with the remaining acid radical of the ester an acid compound which is added to the condensate.

The following equation illustrates this reaction in a simple example, in which the alkylolamide is a reaction product of a higher fatty acid with hydroxyethylethylenediamine and the ester is diethylsulfate. At temperatures up to 100° C. this reaction takes probably the following course:

$$R-CO-NH-C_2H_4-NH-C_2H_4-OH+(C_2H_5)_2-SO_4=$$

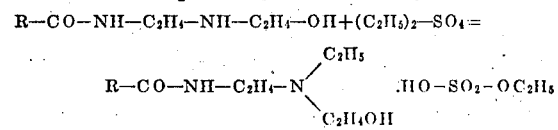

the ethyl sulfuric acid being added to the condensate.

It is not entirely certain which one of the nitrogen groups is alkylated first, but it may be assumed that the last amino group is the first to be condensed because the alkylation takes place more easily if amides having a greater number of amino groups in the molecule are used as starting materials.

It was found that the esters of polyvalent inorganic acids as for instance dimethylsulfate or diethylsulfate, react with one alkyl group at temperatures below 100° C. Higher temperatures are required if a second alkyl group is to be brought into reaction.

According to a specific embodiment of my invention, I use as starting materials for the reaction with the esters alkylolamide polyamines containing at least one uncondensed NH group, one or more of the remaining amino groups having been previously condensed with an aldehyde, as described and claimed in my U. S. Patent 2,186,464.

With an aldehyde condensate of this type in which one or more of the amino groups still contain hydrogen atoms, one or more of these atoms are replaced by alkyls and the acid addition compound is formed with the acid.

Dependent upon the starting materials and temperatures used, the condensates according to the present invention are obtained in concentrated form as oils, pastes or solid masses which, generally, have yellow, brown or red colors. However, the concentrated compounds are easily and clearly soluble in cold water and the aqueous solutions in which they are used for industrial purposes are completely colorless.

The water soluble compounds according to my invention constitute excellent softening agents for the textile and leather industry and they are reliable and efficient emulsifying agents for urea-aldehyde condensates and other artificial resins. If the products are used as assistants in the pre-shrinking treatment of textiles, the results of these treatments are markedly improved.

The following examples will serve to illustrate, without limiting, my invention.

*Example 1*

413 g. (1 mol) of a condensate of stearic acid with hydroxyethyldiethylenetriamine, having the formula $$C_{17}H_{35}-CO-NH-C_2H_4-NH-C_2H_4-NH-C_2H_4-OH$$

are heated to about 90° C. Then 126 g. (1 mol) dimethylsulfate are slowly added under thorough stirring and slight cooling, care being taken that the temperature during the addition of the dimethylsulfate, does not rise above 100° C. As soon as all the dimethylsulfate has been introduced, the temperature is slowly raised under thorough stirring to 140° C. and the mixture is maintained at this temperature in a closed vessel for about two hours. The reaction product has probably the following structural formula:—

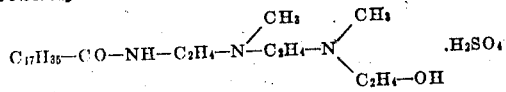

the sulphuric acid being attached to the condensate so as to form an acid addition compound therewith.

The product is a reddish yellow paste which melts at about 42° C. into an oily liquid. It is clearly soluble in water.

*Example 2*

382 g. of a condensate obtained from oleic acid and hydroxypropyl ethylenediamine which has the formula $$C_{17}H_{33}-CO-NH-C_2H_4-NH-C_3H_6-OH$$

are treated with 154 g. diethylsulfate which is slowly stirred into the molten condensate which is sufficiently cooled to prevent rising of the temperature above 90° C. After addition of the entire quantity of diethylsulfate the temperature is maintained at 90° C. for about one hour and then the reaction mixture is cooled.

In this case only one ethyl group of the diethylsulfate has entered into the reaction because the temperature did not exceed 100° C. and, consequently, the reaction product is an ethylsulfuric acid addition compound having probably the following formula:

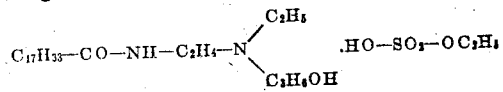

At room temperature the product is a soft mass of orange yellow color.

*Example 3*

413 g. of a condensate of stearic acid and hydroxyethyldiethylenetriamine, according to Example 1, are treated with 308 g. diethylsulfate at about 90° C. Thereafter, the mass is stirred for another hour at 90° C. and then it is cooled.

The reaction product has probably the following formula:

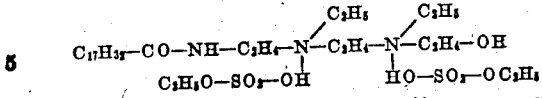

and is the ethylsulfuric acid addition compound of the condensate.

*Example 4*

385 g. of a condensate of castor oil fatty acid and hydroxyethylethylenediamine are first condensed with 38 g. of a 40% formaldehyde solution substantially as described in Example 5 of my U. S. Patent 2,186,464.

The aldehyde condensation product obtained, in which only one of the amino groups of each polyamine molecule is condensed with aldehyde, is then treated at a temperature between 80° C. and 90° C. with 154 g. diethylsulfate and is maintained at this temperature for two more hours. Only one of the ethyl groups enters into the reaction.

The reaction product is an odorless yellow viscous liquid. Diluted with water it forms first a thick paste which, upon further addition of water, is transformed into a clear solution.

I claim:

1. A process for producing water soluble acid addition compounds, which process comprises the steps of mixing at least one mol of an aliphatic ester of a polyvalent inorganic acid, said ester containing in each alcohol radical from 1 to 5 carbon atoms, with one mol of a monoalkylol amide polyamine of the general formula $$R-CO-(NR_1-C_xH_{2x})_n-NR_1-C_yH_{2y}-OH$$

where R represents any aliphatic chain having at least 7 carbon atoms, $x$ and $y$ each represent a number from 2 to 5 inclusive, $n$ represents a number from 1 to 3 inclusive, $R_1$ represents a member of the group consisting of hydrogen and its alkyl substituents, at least one $R_1$ being hydrogen, and reacting said ester with said polyamine at temperatures between about 70° C. and 160° C. until at least one hydrogen atom of an amino group has been replaced by an alkyl and the acid addition compound has been formed.

2. As a new product, a water soluble acid addition compound having the following general formula

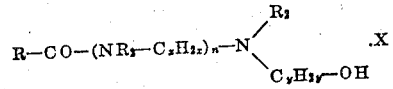

where X is an acid selected from the group consisting of the polyvalent inorganic acids and their aliphatic acid esters containing in each alcohol radical from 1 to 5 carbon atoms, R represents any aliphatic chain having at least 7 carbon atoms, $x$ and $y$ each represent a number from 2 to 5 inclusive, $n$ represents a number from 1 to 3 inclusive, one $R_2$ represents an alkyl containing from 1 to 5 carbon atoms and each remaining $R_2$ represents a member of the group consisting of hydrogen and its alkyl substituents.

ERNST ALFRED MAUERSBERGER.